(12) United States Patent
Burrows et al.

(10) Patent No.: US 8,505,366 B2
(45) Date of Patent: Aug. 13, 2013

(54) SPARK PLUG WITH COMBUSTION SENSOR

(75) Inventors: John A. Burrows, Northwich (GB); Paul Tinwell, Fayence (FR)

(73) Assignee: Federal-Mogul Ignition Company, Southfield, MI (US)

( * ) Notice: Subject to any disclaimer, the term of this patent is extended or adjusted under 35 U.S.C. 154(b) by 441 days.

(21) Appl. No.: 12/696,456

(22) Filed: Jan. 29, 2010

(65) Prior Publication Data

US 2010/0186489 A1   Jul. 29, 2010

Related U.S. Application Data (60) Provisional application No. 61/148,118, filed on Jan. 29, 2009.

(51) Int. Cl.
*G01M 15/08* (2006.01)

(52) U.S. Cl.
USPC ..................................................... 73/114.19

(58) Field of Classification Search
USPC ................. 73/114.16, 114.18, 114.19, 114.21
See application file for complete search history.

(56) References Cited

U.S. PATENT DOCUMENTS

| | | | |
|---|---|---|---|
| 4,169,388 A * | 10/1979 | Teitelbaum et al. | 73/714 |
| 5,726,351 A * | 3/1998 | Glaser | 73/114.19 |
| 6,204,594 B1 | 3/2001 | Ingham | |
| 6,548,945 B1 | 4/2003 | Tamura | |
| 6,756,722 B2 * | 6/2004 | Hiramatsu | 313/144 |
| 7,255,080 B1 | 8/2007 | Leone | |
| 2002/0121127 A1 | 9/2002 | Kiess et al. | |

FOREIGN PATENT DOCUMENTS

| | | |
|---|---|---|
| JP | 6140125 A | 5/1994 |
| JP | 06-302371 A | 10/1994 |
| KR | 1020070062598 A | 6/2007 |
| WO | WO 2008/003846 A1 | 1/2008 |

* cited by examiner

*Primary Examiner* — Eric S McCall
(74) *Attorney, Agent, or Firm* — Robert L. Stearns; Dickinson Wright, PLLC

(57) ABSTRACT

A spark plug assembly has a ceramic insulator with a metal outer shell surrounding at least a portion of the insulator. A ground electrode is operatively attached to the outer shell and a center electrode having an elongate body extends through the insulator. The center electrode and the ground electrode provide a spark gap. A force sensor is received about the insulator. An annular inner shell is received between the outer shell and the insulator, wherein the inner shell has a surface configured to confront the insulator along an axial direction.

8 Claims, 7 Drawing Sheets

SPARK PLUG WITH COMBUSTION SENSOR

CROSS-REFERENCE TO RELATED APPLICATION

This application claims the benefit of U.S. Provisional Application Ser. No. 61/148,118, filed Jan. 29, 2009, which is incorporated herein by reference in its entirety.

BACKGROUND OF THE INVENTION

1. Technical Field

This invention relates generally to ignition devices, and more particularly to spark plugs having an integral combustion sensor.

2. Related Art

It is known to incorporate a sensor in a spark plug assembly to sense the combustion pressure within a cylinder bore during use of the engine. By being able to sense the magnitude of the combustion pressure, it can be determined if the engine is operating as intended, or if service is needed. Unfortunately, current integral sensor spark plug technology is limited in its ability to provide an accurate measurement of the combustion pressure due to various unwanted influences exerting forces on the sensors in addition to the combustion gas forces. These unwanted forces applied to the integral sensor generally occur during installation and/or while the engine is in operation. Accordingly, the pressure measurements obtained by the sensors may not be a true and accurate indication of the combustion forces.

Figure 1:
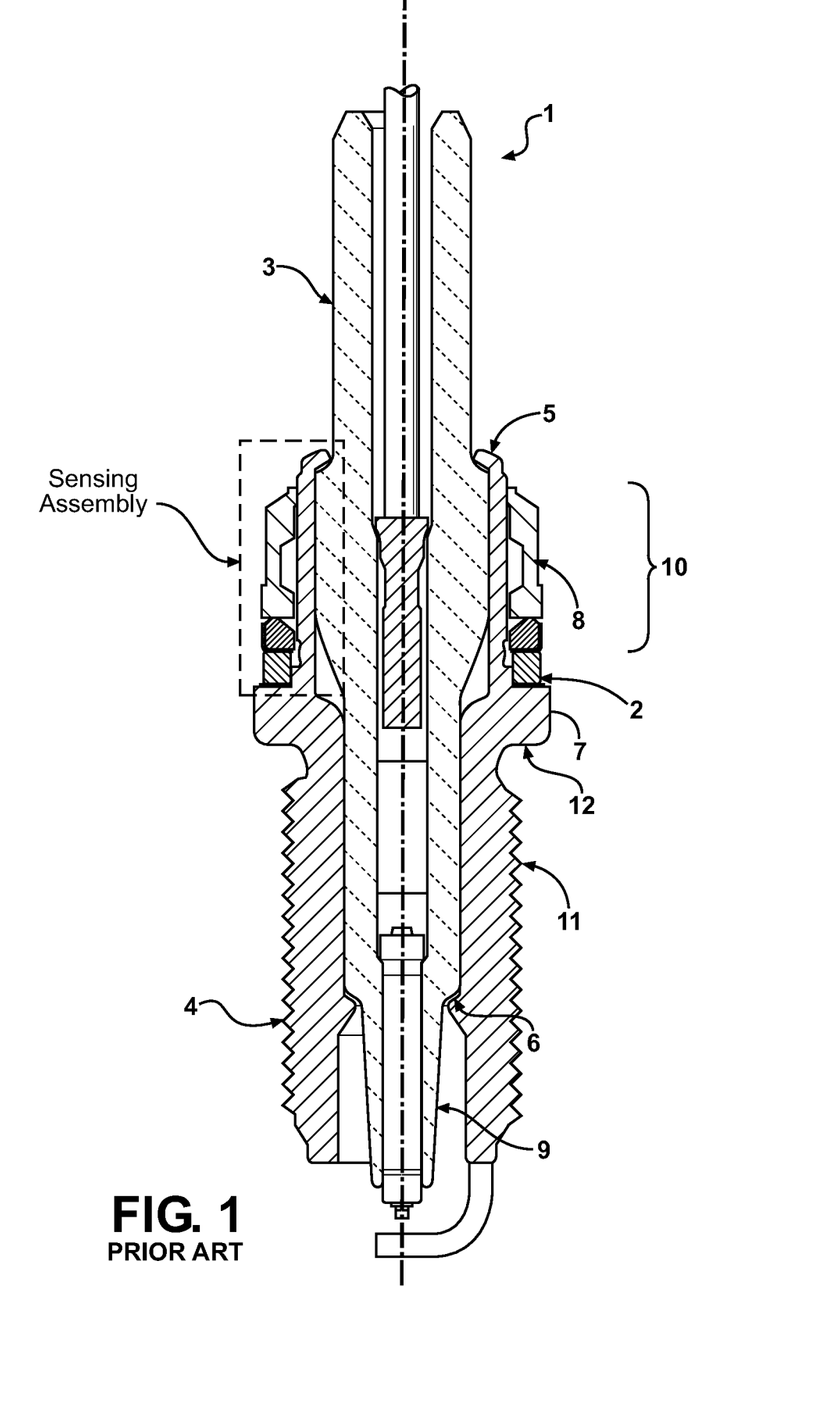
FIG. 1 is a cross-sectional view of a spark plug constructed in accordance with the prior art.

As shown in FIG. 1, a known spark plug assembly 1 has an integral sensor 2 for sensing combustion forces within a cylinder bore. The assembly 1 has a ceramic insulator 3 fixed within a metal outer shell 4. The insulator 3 is fixed under compression between a turnover 5 of the shell 4 and an internal gasket 6. The compression exerted on the insulator 3 acts to provide a reliable seal at the gasket 6 during operating conditions. The sensor 2 is maintained under compression between an external flange 7 of the shell 4 and a hexagonal fitting 8. In operation, combustion forces exerted on a core nose 9 of the insulator 3 pushes the insulator 3 upwards axially away from the cylinder bore, wherein some of the force is transferred through the shell turnover 5 into the shell 4, which in turn, acts to stretch a flexible upper section 10 of the shell 4. As the flexible upper section 10 is stretched, the compression force imparted on the sensor 2 is reduced, which is interpreted as a direct correlation of the combustion force within the cylinder bore. However, during installation of the spark plug assembly 1 into the cylinder block, a tensile force is established between an external thread region 11 of the shell 4 and a gasket sealing face 12 on the bottom sealing surface of the external flange 7. The magnitude of the tensile force can vary from one assembly to another as a result of tightening torque tolerances and during normal use due to, for example, temperature fluctuations or uncontrolled deformations of the cylinder head. Regardless of the magnitude of the tensile force, the tensile force tends to reduce the force that compresses the insulator 3 between the turnover 5 and the gasket 6 in an uncontrollable and unknown manner. As such, the tension exerted during combustion on the flexible section 10 is reduced, which directly affects the "as assembled" preload force applied on the sensor 2 in an unknown and uncontrollable fashion. Thus, the force magnitude indicated by the sensor 2 during combustion may not be an accurate indication of the compression pressure within the cylinder bore.

SUMMARY OF THE INVENTION

A spark plug assembly has a generally annular ceramic insulator with a metal annular outer shell surrounding at least a portion of the ceramic insulator. A ground electrode is operatively attached to the outer shell. A center electrode has an elongate body extending through the insulator, with the center electrode and the ground electrode providing a spark gap. A force sensor is received about the insulator. An annular inner shell is received between the outer shell and the insulator, wherein the inner shell has a surface configured to confront the insulator along an axial direction.

In accordance with another aspect of the invention, the inner shell has a surface configured to confront the outer shell along an axial direction.

A spark plug constructed in accordance with the invention, including an integral combustion sensor, is able to be assembled and installed into a cylinder head with having affecting a predetermined preload applied to the sensor during construction of the spark plug. As such, upon being installed into the cylinder head, the axially applied force on the sensor remains "as assembled" at the predetermined force. Thus, during use, the sensor in not adversely affected by forces created during assembly to the cylinder head, and thus, the sensor is able to send a signal to that accurately depicts the true combustion pressure within a cylinder bore of the engine.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 2:
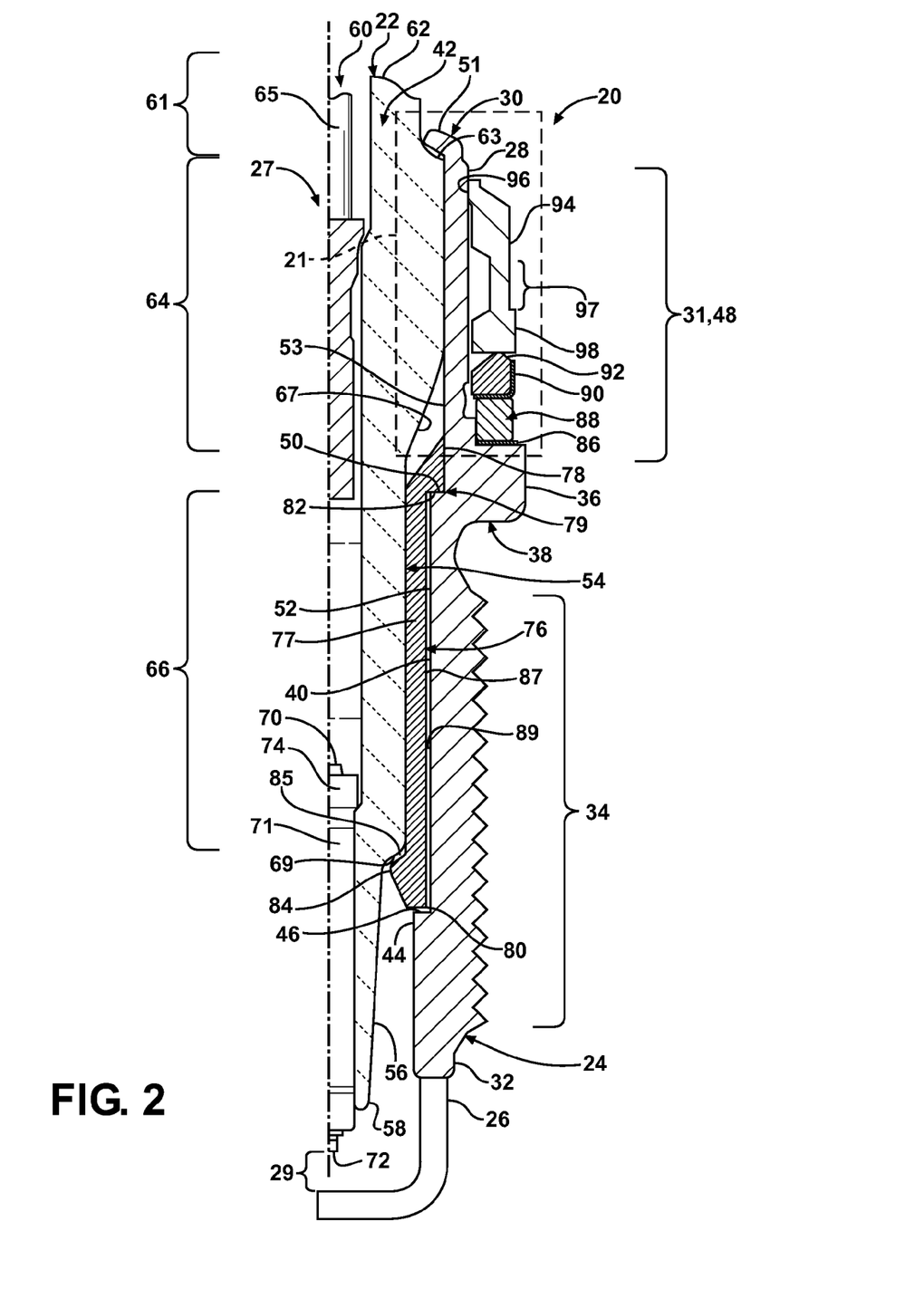
FIG. 2 is a partial cross-sectional view of a spark plug constructed in accordance with one aspect of the invention.

Referring in more detail to the drawings, FIG. 2 illustrates a spark plug assembly 20 constructed in accordance with one presently preferred embodiment of the invention. The assembly 20 has an annular ceramic insulator 22 and a metal annular outer shell 24 surrounding at least a portion of the ceramic insulator 22. A ground electrode 26 is operatively attached to the outer shell 24 and a center electrode assembly 27 has an elongate body extending through the insulator 22, with the center electrode assembly 27 and the ground electrode 26 providing a spark gap 29, as is known. A sensor assembly is outlined generally at 21, wherein the sensor assembly 21 is assembled to form an integral component of the spark plug assembly 20 and is configured to indicate the combustion pressures within a cylinder bore of a cylinder block (not shown) over which the spark plug assembly 20 is positioned. The sensor assembly 21 is attached to the spark plug assembly 20 such that the combustion pressure within the cylinder bore is accurately measured without being affected by extraneous forces, e.g. tensile forces established while threading the spark plug assembly 20 to the cylinder block and temperature changes and/or uncontrolled deformations of the cylinder head.

The electrically conductive metal outer shell 24 may be made from any suitable metal, including various coated and uncoated steel alloys. The shell 24 has a generally tubular body with a generally annular outer surface 28 extending between an upper terminal end 30 including a barrel portion 31 and a lower fastening end 32. The fastening end 32 typically has an external or male threaded region 34 configured for threaded attachment within an internal or female threaded opening of a cylinder head (not shown). The shell 24 also has an annular flange 36 extending radially outwardly to provide an annular, generally planar sealing seat 38 for sealing engagement with an upper surface of the cylinder head with the threaded region 34 depending therefrom. The sealing seat 38 may be paired with a gasket (not shown) to facilitate forming a hot gas seal between the outer surface of the shell 24 and the cylinder head. Alternately, the sealing seat 38 may be configured as a tapered seat to provide a close tolerance and a self-sealing installation with a mating annular tapered surface of the cylinder head.

The ground electrode 26 is attached to the fastening end 32, as is known, and is depicted in part having a commonly used single L-shaped style, although it will be appreciated that multiple ground electrodes of straight, bent, annular, trochoidal and other configurations can be substituted depending upon the intended application for the spark plug assembly 20, including two, three and four ground electrode configurations, and those where the electrodes are joined together by annular rings and other structures used to achieve particular sparking surface configurations.

The tubular shell body of the outer shell 24 has an inner wall or surface 40 providing an open cavity 42 extending through the length of the shell between the terminal and fastening ends 30, 32. An annular internal lower flange 44 extends radially inwardly from the inner surface 40 adjacent the fastening end 32 to provide a lower stop surface 46. The inner surface 40 is represented in the embodiment of FIG. 2 as having an enlarged diameter region 48 adjacent the terminal end 30 to accommodate the insulator 14. Accordingly, an annular upper flange or shoulder 50 extends radially inwardly from the enlarged diameter region 48 to a reduced diameter region 52 of the cavity 42. The enlarged diameter region 48 extends upwardly from the shoulder 50 and has a substantially straight, cylindrical and constant diameter to an annular turnover 51 that extends radially inwardly to retain the insulator 22 at the terminal end 30. The shell 24 may also include a deformable buckle zone 53 designed and adapted to collapse axially and radially outwardly in response to heating and associated application of an overwhelming axial compressive force subsequent to the deformation of the turnover 51, wherein the turnover 51 holds the shell 24 in a fixed axial position with respect to the insulator 22 and forms a gas-tight seal between insulator 22 and the shell 24. Gaskets, cement, or other packing or sealing compounds can also be interposed between the insulator 22 and the shell 24 to perfect a gas-tight seal and to improve the structural integrity of the spark plug assembly 20.

Unlike most spark plug shells, the shell 24 does not include an attachment portion on an upper portion of the barrel 31, such as a tool receiving hexagon or other feature for removal and installation of the spark plug in a combustion chamber opening. The outer surface of the barrel 31 is substantially cylindrical, with an attachment portion being incorporated into the sensor assembly 21, as discussed below.

The insulator 22, which may include aluminum oxide or another suitable electrically insulating material having a specified dielectric strength, high mechanical strength, high thermal conductivity, and excellent resistance to thermal shock, may be press molded from a ceramic powder in a green state and then sintered at a high temperature sufficient to densify and sinter the ceramic powder. The insulator 22 has an elongate body with an annular outer surface 54 extending between an upper terminal or proximal end (out of view) and a lower distal end 58. The insulator 22 is of generally tubular or annular construction, including a central bore or passage 60, extending longitudinally between an upper mast portion 62 proximate the terminal or proximal end and a lower nose portion 56 proximate the distal end 58. The central passage 60 is of varying cross-sectional diameter, generally greatest at or adjacent the terminal end and smallest at or adjacent the core nose end 58, thereby generally having a continuous series of tubular sections of varying diameter. These sections include a first insulator section 61 which surrounds a connector extension of a terminal stud portion 65 of the center electrode assembly 27. This first insulator section 61 has an outer surface that transitions to an uppermost radially outwardly extending first insulator shoulder 63 which is in pressing engagement with the turn-over 51 of the shell 24. The shoulder 63 transitions to a second insulator section 64 having a diameter which is greater than the diameter of the first insulator section 61. The second insulator section 64 is housed within the barrel portion 31 of the shell 24. The second section 64 transitions to a third insulator section 66 via an annular, tapered second shoulder 67. The third insulator section 66 preferably has a diameter less than the diameter of the second insulator section 64, and generally less than the diameter of the first insulator section 61. Accordingly, the intermediate second insulator section 64 extends radially outwardly from the first and third insulator sections 61, 64. The third insulator section 66 then transitions to the reduced diameter, tapered core nose 56 via a third insulator shoulder 69.

The center electrode assembly has a center electrode 71 that may have any suitable shape, and is represented here, by way of example and without limitation, as having a body with a generally cylindrical outer surface extending generally between an upper terminal end 70 and a lower firing end 72, and having a radially outward arcuate flair or taper to an increased diameter head 74 at the terminal end 70. The annular head 74 facilitates seating and sealing the terminal end 70 within the insulator 22, while the firing end 72 generally extends out of nose portion 56 of the insulator 22. The center electrode 71 is constructed from any suitable conductor material, as is well-known in the field of sparkplug manufacture, such as various Ni and Ni-based alloys, for example, and may also include such materials clad over a Cu or Cu-based alloy core.

An annular inner shell 76 is received between the outer shell 24 and the insulator 22, and is shown here as having a tubular wall 77 extending between an upper end 78 adjacent the second shoulder 67 of the insulator 22 and a lower end 80 adjacent the lowermost third shoulder 69 of the insulator 22. A small annular gap or space 89 is formed between an outer surface 87 of the inner shell 76 and the inner surface of the outer shell 24. The upper end 78 is configured to be fixed to the outer shell 24 at a joint 79, and is shown here as having a radially outwardly extending shoulder 82 configured to overlie and abut the outer shell upper shoulder 50 in fixed relation thereto axially above the external sealing seat 38. The joint 79 formed between the respective shoulders 82, 50 can be formed using various mechanisms, such as by an interference fit, welding, brazing, or by axial preload during assembly, for example, wherein the joint 79 is the only location of contact between the outer shell 24 and the inner shell 76. The lower end 80 has a radially inwardly extending annular surface, also referred to as shoulder 84, configured to abut or axially confront the lowermost third shoulder 69 of the insulator 22. An annular gasket 85 can be disposed between the shoulders 84, 69 to facilitate forming a gas-tight seal, if desired.

Figure 4A:
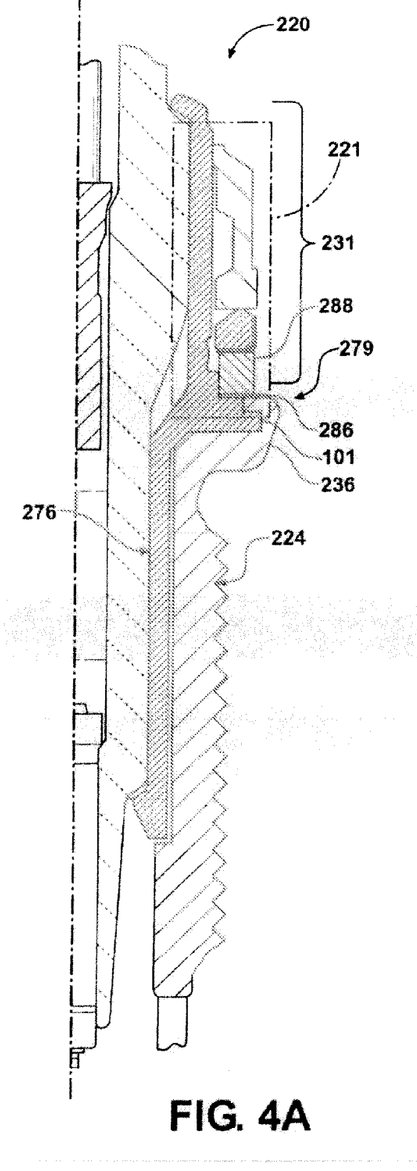
FIG. 4A is a partial cross-sectional view of a spark plug constructed in accordance with another aspect of the invention.
Figure 4B:
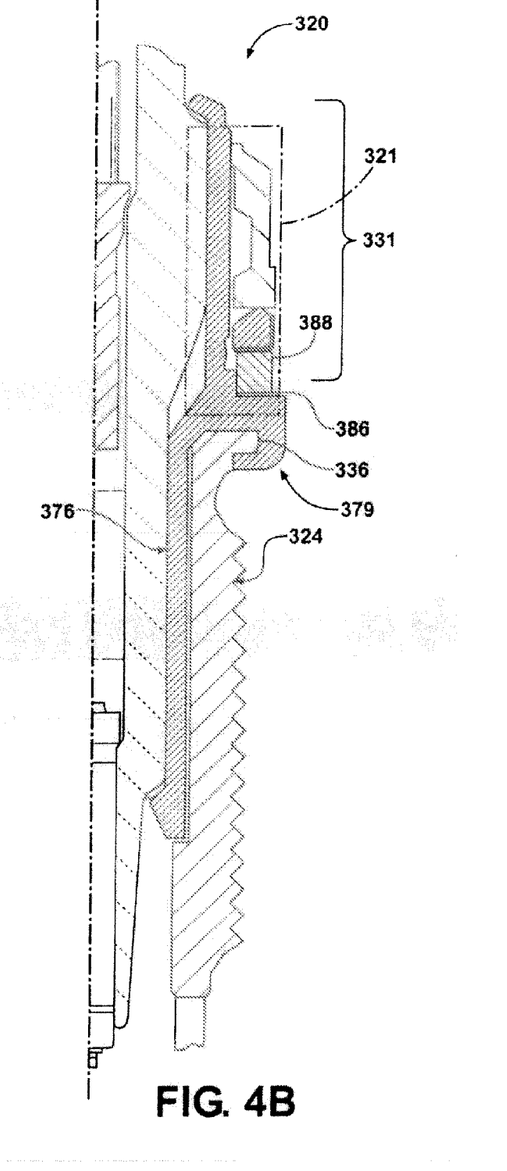
FIG. 4B is a partial cross-sectional view of a spark plug constructed in accordance with another aspect of the invention.

In FIG. 4B, a spark plug assembly constructed in accordance with another aspect of the invention is shown generally at 320, wherein the same reference numerals as used above, offset by a factor of 300, are used to identify like features as described above.

The integral pressure sensor assembly 21 is a piezo-based sensor assembly which is operative as a pressure transducer. The pressure sensor assembly 21 converts mechanical elastic strain energy induced into the spark plug assembly 20 via variation of in-cylinder pressure into an electrical output signal. The output signal provides important information about the combustion events, wherein the information is used to control various vehicle control functions. The piezo sensor assembly may be either a piezoelectric sensor assembly that produces a variable output voltage as a sensor signal or a piezoresistive sensor assembly that produces a variable resistance as a sensor signal, depending on the piezo transducer selected.

The piezo sensor assembly 21 abuts the barrel shoulder or flange 36 and extends upwardly from the flange 36 along the barrel 31. The piezo sensor assembly 21 includes a lower electrode contact 86, a piezo transducer 88, an upper electrode contact 90, an isolator 92 and an upper bushing 94. These elements are placed concentrically over the barrel 31 in the sequence aforementioned and then operatively joined together by application of a predetermined compressive assembly preload and held together under the assembly preload by fixing the upper bushing 94 to the barrel 31, such as by weld joint.

The lower electrode contact 86 is in the form of a thin planar ring having an inner diameter that is greater than the outer diameter of the barrel 31 such that the lower electrode contact 86 may be assembled by placing it over the barrel 31 in a clearance fit. The outer diameter of the lower electrode contact 86 is sized appropriately in conjunction with the barrel shoulder 36 to enable it to rest on the barrel shoulder 36. As such, a lower surface of lower electrode contact 86 abuts the barrel shoulder 36 and an upper surface provides both the mechanical seat and electrical contact for the piezo transducer 88. The barrel shoulder 36 is of an appropriate thickness so that it does not plastically deform in response to the assembly preload. The lower electrode contact 86 may be made from any suitable electrically conductive material, including many pure metals and alloys. However, it is preferred that the lower electrode contact 86 be formed from a conductive material which is not easily degraded with regard to its properties as an electrical contact in an engine operating environment, including having resistance to high temperature oxidation and corrosion processes known to occur in these environments, such as brass, by way of example and without limitation.

The piezo transducer 88 is in the form of a cylindrical ring or disk. While many cross-sectional configurations are believed to be possible, the piezo transducer 88 may have a rectangular cross-section, including a square cross-section. The piezo transducer 88 may be either a piezoelectric transducer that is operative to produce a variable output voltage as a sensor signal or a piezoresistive transducer that is operative to produce a variable resistance as a sensor signal. The piezo transducer 88 has an inner diameter that is greater than the outer diameter of the barrel 31 such that it may be assembled by placing it over the barrel 31 in a clearance fit, and is sized so as not to contact the barrel 31 during assembly and operation, thereby avoiding frictional losses associated with the movement of the transducer 88. The inner and outer diameters of piezo transducer 88 are sized appropriately in conjunction with lower electrode contact 86 so as to enable the lower surface of piezo transducer 88 to rest on the upper surface of lower electrode contact 86. The same diametral relationship holds true with respect to the contact between the upper surface of piezo transducer 88 and the lower surface of the upper electrode contact 90. The piezo transducer 88 may be formed from any suitable piezoelectric or piezoresistive material. In one exemplary embodiment, the piezo transducer 88 is a piezoelectric transducer formed from a piezo ceramic. The piezo ceramic may include titanates, niobates, tantalates, tungstates or quartz.

The upper electrode contact 90 is in the form of a L-shaped ring configured having a generally cylindrical outer surface and an inner diameter provided by a radially inwardly extending leg that is greater than the outer diameter of the barrel 31 such that the upper electrode contact 90 may be assembled by placing it over the barrel 31 in a clearance fit. The inner diameter is sized so as to remain spaced and electrically isolated from the outer surface of the barrel 31. The outer diameter of upper electrode contact 90 is sized appropriately in conjunction with the upper surface of the piezo transducer 88 to enable the lower surface of the upper electrode contact 90 to cover the upper surface of the piezo transducer 88. The upper electrode contact 90 may be made from any suitable conductive material, including many pure metals and alloys. However, it is also preferred that the upper electrode contact 90 be formed from a conductive material which is not easily degraded with regard to its properties as an electrical contact in an engine operating environment, including having resistance to high temperature oxidation and corrosion processes known to occur in these environments, such as brass, by way of example and without limitation. The lower surface of upper electrode contact 90 abuts the upper surface of the piezo transducer 88 and the lower surface provides both the mechanical seat and electrical contact for the piezo transducer 88. Electrical contact with the piezo sensor assembly 21 for transmitting electrical signal output of the assembly is made through the upper electrode contact 90, preferably by making a suitable electrical contact with a signal wire (not shown). Any suitable form of electrical contact can be utilized, such as a shielded co-axial cable, for example.

The isolator 92 is in the form of a chamfered cylindrical ring or disk. While many cross-sectional configurations are believed to be possible, the isolator 92 may have a generally rectangular cross-section, including a square cross-section, with a flat lower surface and a convex upper surface, or an upper surface that is truncated by at least one chamfer, shown here as having small chamfers or radii along opposite circumferential edges. By altering the number of chamfers, length of the chamfers and their angle, line contact can be ensured, and the axis of the line of force can be shifted radially inwardly or outwardly, as desired. By limiting the contact to a line contact via the converging chamfers, the application of radial forces associated with the elements of the sensor assembly, including those associated with thermal expansion mismatch of the elements can be reduced. In addition, the application of the axial forces can be more precisely controlled as to the location of the application of the forces as well as the magnitude of the forces applied. By reducing the contact surface area, non-uniformity of the forces applied through the surface to the associated components is also reduced. The isolator 92 may be made from any electrically insulating material that is operative to electrically isolate the upper electrode contact 90 and the piezo transducer 88. The isolator 92 is also a mechanical actuator transferring mechanical energy to the upper electrode contact 90 and the piezo transducer 88 and is preferably formed from a material having a high modulus of elasticity at engine operating temperatures, particularly in compression, such as a ceramic. The isolator 92 has a diameter that is greater than the outer diameter of the barrel 31 such that the isolator 92 may be assembled by placing it over the barrel 31 in a clearance fit, and is sized so as not to contact the barrel 31 during manufacture and during operation of the piezo sensor assembly 21, thereby avoiding frictional loses associated with the axial movement of the isolator 92. The inner and outer diameters of the isolator 92 are sized appropriately in conjunction with the upper electrode contact 90 so as to enable the lower surface of the isolator 92 to rest on the upper surface of the upper electrode contact 90 while also fitting within the L-shaped configuration of the upper electrode contact 90. The height of the isolator 92 is sufficiently large to provide electrical and mechanical isolation of the L-shaped leg of the upper electrode contact 92 from the upper bushing 94. The isolator 92 may be formed from any suitable dielectric material. In the exemplary embodiment noted, the isolator 92 was formed from an alumina-based ceramic, such as that used for the insulator 22.

The upper bushing 94 engages and is welded to the outer surface of the barrel 31. The elements of the piezo sensor assembly 21 are in touching contact with one another under a compressive preload by pressure applied from the upper bushing 94 to the upper surface of the isolator 92. The welding of the upper bushing 94 to the barrel 31 fixes the "as assembled" preload at some predetermined preload. The upper bushing 94 is in the form of a cylindrical ring having an inner diameter that is substantially greater than the outer diameter of the barrel 31 such that the upper bushing 94 may be assembled generally by placing it over the barrel 31. The upper bushing 94 includes an inwardly extending alignment lip 96. The inner diameter of the lip 96 is slightly less than the outer diameter of the barrel 31 to establish a slight interference fit and aid in the concentric alignment of the upper bushing 94. The cylindrical ring shape of the upper bushing 94 has a thinned section 97 which is thinned by incorporation of a counterbore on the inside diameter of the midsection of the bushing 94, for example. By incorporation of the thinned section 97, the elastic flexibility of the upper bushing 94 is increased providing a spring-like radial response characteristic to the upper bushing 94. The outer surface of the upper bushing 94 has a suitable spark plug attachment feature 98, such as a hex or bi-hex. The feature size will preferably conform with an industry standard tool size of this type for the related spark plug application. Of course, some applications may call for a tool receiving interface other than a hexagon, such as slots to receive a standard spanner wrench, or other features such as are known in racing spark plug and other applications and in other environments. The upper bushing 94 may also include a lug which may be used for attachment of a signal cable and connector (not shown) used to transmit the output signal from the piezo sensor assembly 21 to a signal processing device, such as an engine controller or other engine diagnostic device. Alternately, the upper bushing 94 can also be formed without a lug. The upper bushing 94 may be made from any suitable material, including various grades of steel and plated steel. However, it is preferred that the upper bushing 94 be made from a material having a coefficient of thermal expansion that is less than steel and as close as possible to that of the ceramic insulator material, such as Kovar, and further a material that also has enhanced performance in an engine operating environment, including having resistance to high temperature oxidation and corrosion processes known to occur in these environments. Kovar is a nickel-cobalt-iron alloy having a nominal composition, by weight, of about 29% Ni, 17% Co, 0.30% Mn, 0.20% Si and 0.02% C and the balance Fe. In the exemplary embodiment noted, the upper bushing 94 was made from Kovar. The lower surface of the upper bushing 94 abuts the upper surface of the isolator 92 and provides the mechanical seat for the isolator 92.

During assembly, the elements of piezo sensor assembly 21 are placed over the barrel 31; subjected to a predetermined compressive preload of about 360 lbs., and then the upper bushing 94 is laser-welded to the barrel 31 to fix the desired assembly preload. During attachment of the finished spark plug assembly 20 into the threaded opening of the cylinder head, the forces applied by the cylinder head, which occur between the external threaded region 34 of the shell 24 and the sealing seat 38, do not have any significant affect on the compressive "as assembled" preload imparted on the transducer 88 during assembly of the sensor assembly 21. This is due to the incorporation of the inner shell 76, which acts to prevent the transference of any forces imparted on the outer shell 24 to the sensor assembly 21 during attachment of the spark plug assembly 20 to the cylinder head. As tensile forces are distributed over the threaded region 34 of the outer shell 24, the wall 77 of the inner shell remains substantially free from the these forces, and thus, substantially no force is transferred through to the insulator 22, and thus, the insulator 22 remains substantially stationary relative to the outer shell 24. As such, the preload force imparted on the sensor assembly 21 remains "as assembled". During operation of the spark plug assembly 20, with each combustion event of the fuel-air mixture, the pressure of the expanding combustion gases tends to press axially against the nose portion 56 of the insulator 22. This causes the insulator 22 to bear against the turn-over 51 of the shell 24 and causes the cyclic elastic tensile deformation of the barrel 31 opposite the piezo sensor assembly 21. This elastic tensile stretching of the shell 24 during a combustion event also cyclically reduces the "as assembled" preload of the piezo sensor assembly 21 and produces an electrical signal which correlates to the pressure exerted by the combustion gases, wherein the signal may be output through the upper electrode contact 90, as discussed above. In addition, an increased flexibility provided by the inner shell 76, as it is not constrained directly by the cylinder block, enhances the freedom of the insulator 22 to move axially within the shell 124 over the prior art, and thus, ultimately produces a larger, improved and more representative signal from the sensor assembly 21.

Figure 3:
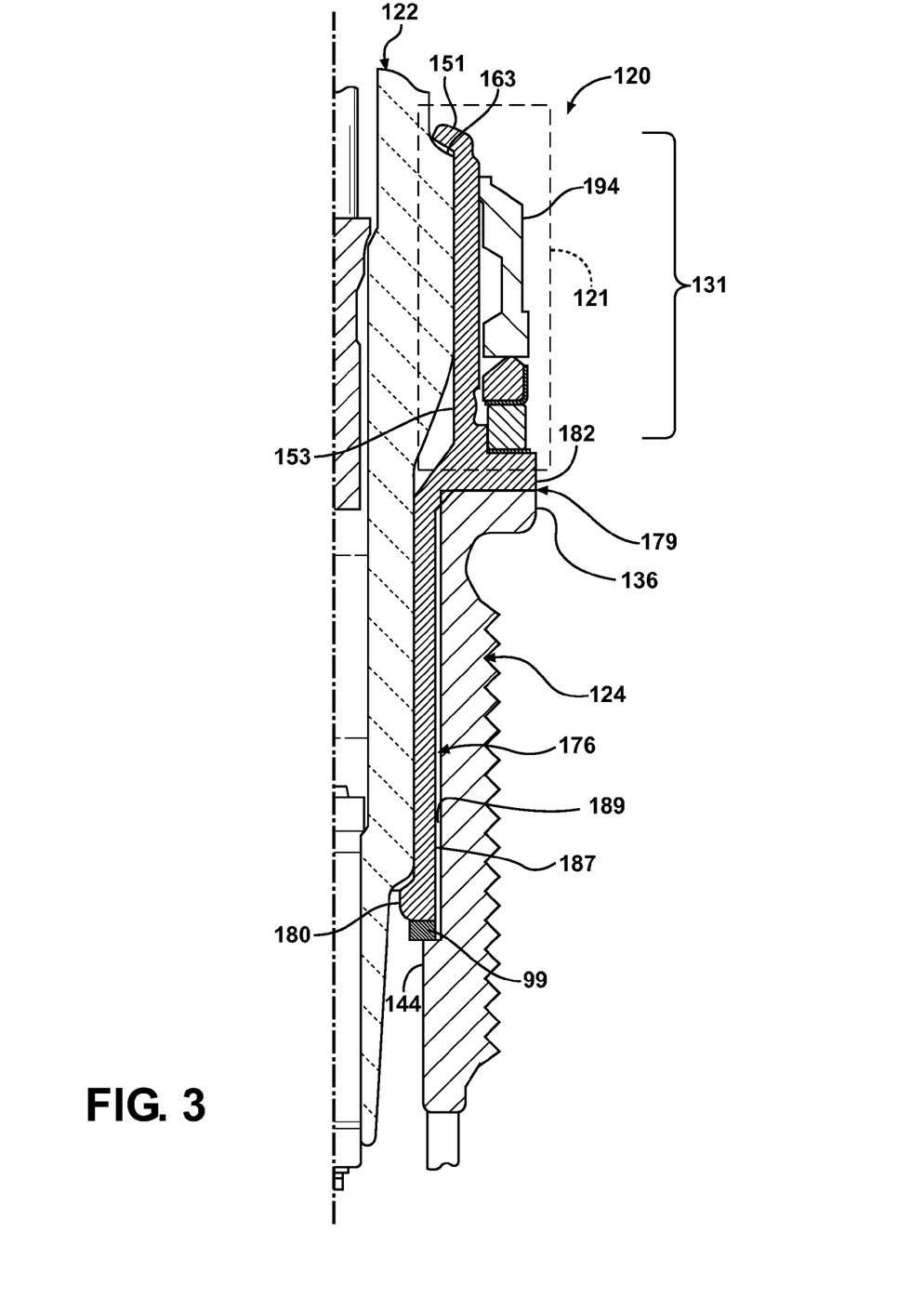
FIG. 3 is a partial cross-sectional view of a spark plug constructed in accordance with another aspect of the invention.

In FIG. 3, a spark plug assembly constructed in accordance with another aspect of the invention is shown generally at 120, wherein the same reference numerals as used above, offset by a factor of 100, are used to identify like features as described above. One notable difference in this embodiment is that an outer shell 124 does not form a barrel of the assembly, as above, but rather, a barrel 131 is formed by a metal inner shell 176. As such, the outer shell 124 terminates at a flange 136, on which a fixed joint 179 between an outwardly extending shoulder 182 of the inner shell and the flange 136 is formed, such as by welding, brazing any other suitable connection providing a gas-tight seal, with the inner shell 176 extending from a lower end 180 upwardly beyond the flange 136 of the outer shell 124 to a turnover 151. The turnover 151 functions the same as described above for sealed engagement about a first shoulder 163 of an insulator 122, wherein the insulator is constructed the same as discussed above. The barrel 131 formed by the inner shell 176 is configured substantially the same as discussed above, including a buckle zone 153, and thus, no further discussion of this region is necessary. In addition, a flexible seal 99 is provided between the lower end 180 of the inner shell 176 and a lower flange 144 of the outer shell 124. The seal 99 prevents contamination from entering the small annular gap or space 189 formed between an outer surface 187 of the inner shell 176 and the inner surface of the outer shell 124. The seal 99 is formed so that it does not transmit significant forces along an axial direction, due its axial flexibility, thereby avoiding the transference of loads to the sensor assembly 121. However, the seal 99 can be formed to assist with vibration control, wherein the seal 99 can be constructed from a suitable elastomeric material formed in the shape of an O-ring, or other suitable materials, such as a spring washer, conical spring, flexible membrane, or the like. The overall structure of the sensor assembly 121 remains the same as discussed above, and is assembled in the same fashion by placing the various components over the barrel 131 of the inner shell 176, and then a desired preload is imparted and maintained on the transducer via the bushing 194. The function of the spark plug assembly 120 is substantially similar, particularly in that any forces imparted on the outer shell 124 during assembly to the cylinder head are kept from affecting the "as assembled" preload on the transducer of the sensor assembly 121.

In FIG. 4A, a spark plug assembly constructed in accordance with another aspect of the invention is shown generally at 220, wherein the same reference numerals as used above, offset by a factor of 200, are used to identify like features as described above. The structure of the spark plug assembly is similar to the spark plug assembly 120, wherein a barrel 231 is formed by a metal inner shell 276. However, rather than a fixed joint being formed across substantially planar, parallel surfaces of the outer and inner shells 224, 276, a fixed joint 279 is formed via a folded joint, wherein material on the outer shell 224 extending radially outwardly from a sealing flange 236 is folded or rolled over an annular radially outwardly extending flange 101 on the inner shell 276. Upon the outer shell 224 being fixed to the inner shell 276, a surface comprising both material from the inner shell 276 and the outer shell 224 provides an annular planar surface on which a lower electrode contact 286 rests. Otherwise, the function of the spark plug assembly 220 is substantially similar as those discussed above, particularly in that any forces imparted on the outer shell 224 during assembly to the cylinder head are prevented from affecting the "as assembled" preload on a transducer 288 of a sensor assembly 221 of the spark plug assembly 220.

The structure of the spark plug assembly is similar to the spark plug assembly 120, wherein a barrel 331 is formed by a metal inner shell 376. As with the previous embodiment, a fixed joint 379 connecting an outer shell 324 to the inner shell 376 is formed as a folded joint. However, in this embodiment, material on the inner shell 376 extending radially outwardly from a sealing flange 336 of the outer shell 324 is folded or rolled over the sealing flange 336. The annular, planar surface on which a lower electrode contact 386 rests is formed entirely from material of the inner shell 376. Otherwise, the construction and function of the spark plug assembly 320 is substantially the same as that of the assembly 220, particularly in that any forces imparted on the outer shell 324 during assembly to the cylinder head are kept from affecting the "as assembled" preload on a transducer 388 of a sensor assembly 321 of the spark plug assembly 320.

Figure 5:
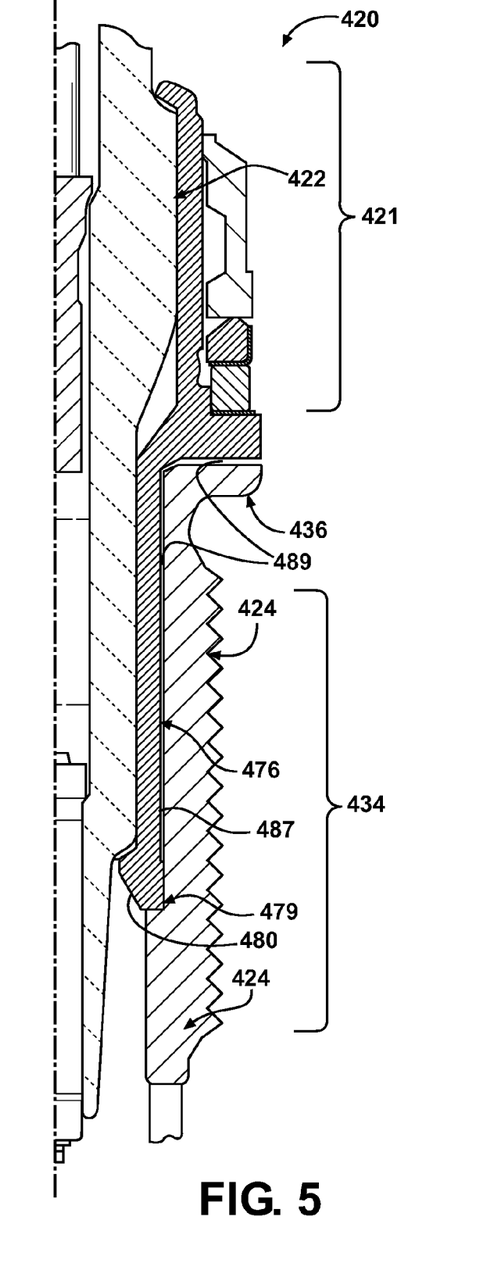
FIG. 5 is a partial cross-sectional view of a spark plug constructed in accordance with another aspect of the invention.

In FIG. 5, a spark plug assembly constructed in accordance with another aspect of the invention is shown generally at 420, wherein the same reference numerals as used above, offset by a factor of 400, are used to identify like features as described above. The spark plug assembly 420 is similar to the assembly 120 illustrated in FIG. 3, including a sensor assembly 421, however, the location in which an outer shell 424 is fixed to an inner shell 476 is different. Rather than forming a fixed joint above a sealing flange 436 of the outer shell 424, a fixed joint 479 is formed at and/or adjacent a lower end 480 of the inner shell 476, with the remaining portions of the inner and outer shells 476, 424 remaining spaced and detached from one another by a gap 489. With the joint 479 being formed in this location, optimal heat transfer is provided from an insulator 422 to a threaded region 434 of the outer shell 424, and then to the cylinder head. In addition, the small annular and planar gap 489 provided between an outer surface 487 of the inner shell 476 and the inner surface of the outer shell 424 is sealed off by the joint 479 from combustion gasses, thereby avoiding any affects the combustion gases might otherwise have on the ability to accurately detect combustion forces via a sensor assembly 421 of the spark plug assembly 420.

Figure 6:
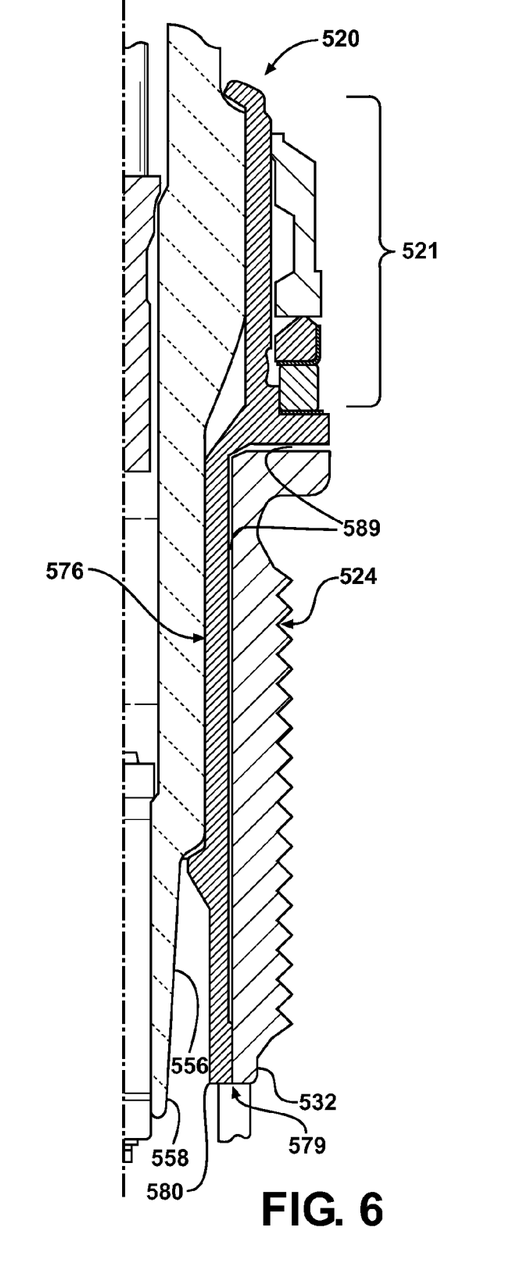
FIG. 6 is a partial cross-sectional view of a spark plug constructed in accordance with another aspect of the invention.

In FIG. 6, a spark plug assembly constructed in accordance with another aspect of the invention is shown generally at 520, wherein the same reference numerals as used above, offset by a factor of 500, are used to identify like features as described above. The assembly 520 is similar to the previously described assembly 420, including a sensor assembly 521, however, an inner shell 576 extends to a lower end 580 that is substantially flush with a fastening end 532 of an outer shell 524. An axially extending fixed joint 579 is formed immediately adjacent free ends 580, 532 of the inner and outer shells 576, 524, which is adjacent a distal end 558 of an insulator nose 556. As with the above embodiments, other than the fixed joint 579, the inner shell 576 and the outer shell 524 remain detached from one another along a gap 589 to avoid affecting the ability of the sensor assembly 521 to accurately indicate the combustion pressures with the cylinder bores.

Figure 7:
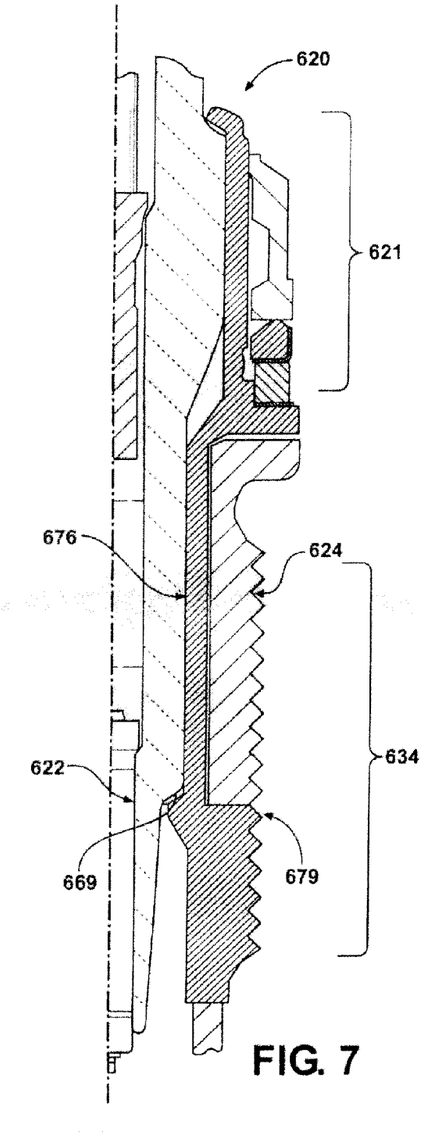
FIG. 7 is a partial cross-sectional view of a spark plug constructed in accordance with another aspect of the invention.

In FIG. 7, a spark plug assembly constructed in accordance with another aspect of the invention is shown generally at 620, wherein the same reference numerals as used above, offset by a factor of 600, are used to identify like features as described above. The assembly 620 is similar to that shown in FIGS. 5 and 6, including a sensor assembly 621, however, a threaded region 634 is formed on both an outer shell 624 and an inner shell 676. The inner shell 676 forms a lower portion of the threaded region 634 while the outer shell 624 forms an upper portion of the threaded region 634. In construction, the inner shell 676 is attached to the outer shell 624 at a radially extending fixed joint 679 which extends substantially transversely to the threaded region 634 adjacent a lowermost third shoulder 669 of an insulator 622.

Figure 8:
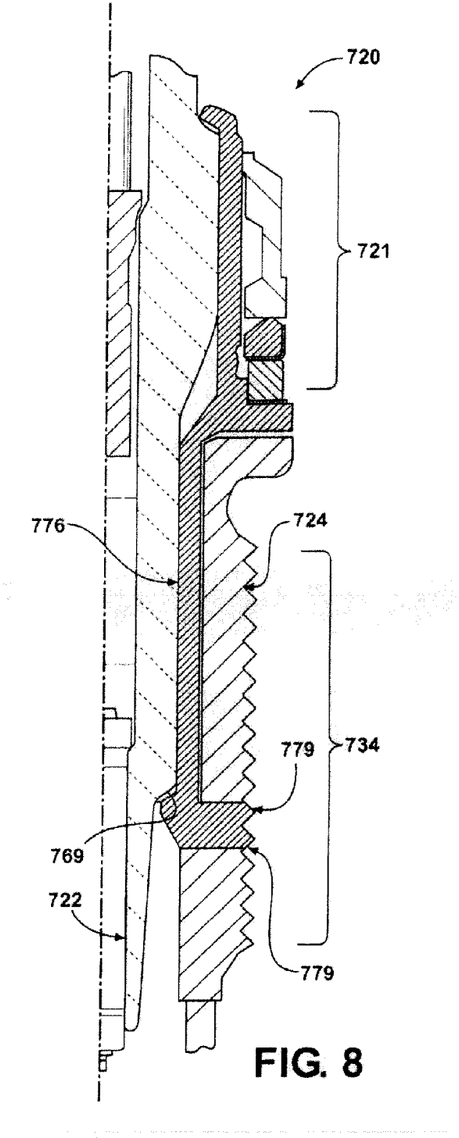
FIG. 8 is a partial cross-sectional view of a spark plug constructed in accordance with another aspect of the invention.

In FIG. 8, a spark plug assembly constructed in accordance with another aspect of the invention is shown generally at 720, wherein the same reference numerals as used above, offset by a factor of 700, are used to identify like features as described above. The assembly 720 is similar to that shown in FIG. 7, including a sensor assembly 721, however, an inner shell 776 forms a mid-portion of a threaded region 734 while an outer shell 724 forms an upper and lower portion of the threaded region 734. As with the embodiment in FIG. 7, in construction, the inner shell 776 is attached to the outer shell 724 at a pair of radially extending fixed joints 779 which extend substantially transversely to the threaded region 734 adjacent a lowermost third shoulder 769 of the insulator 722, and then, the threaded region 734 is formed thereafter.

Figure 9:
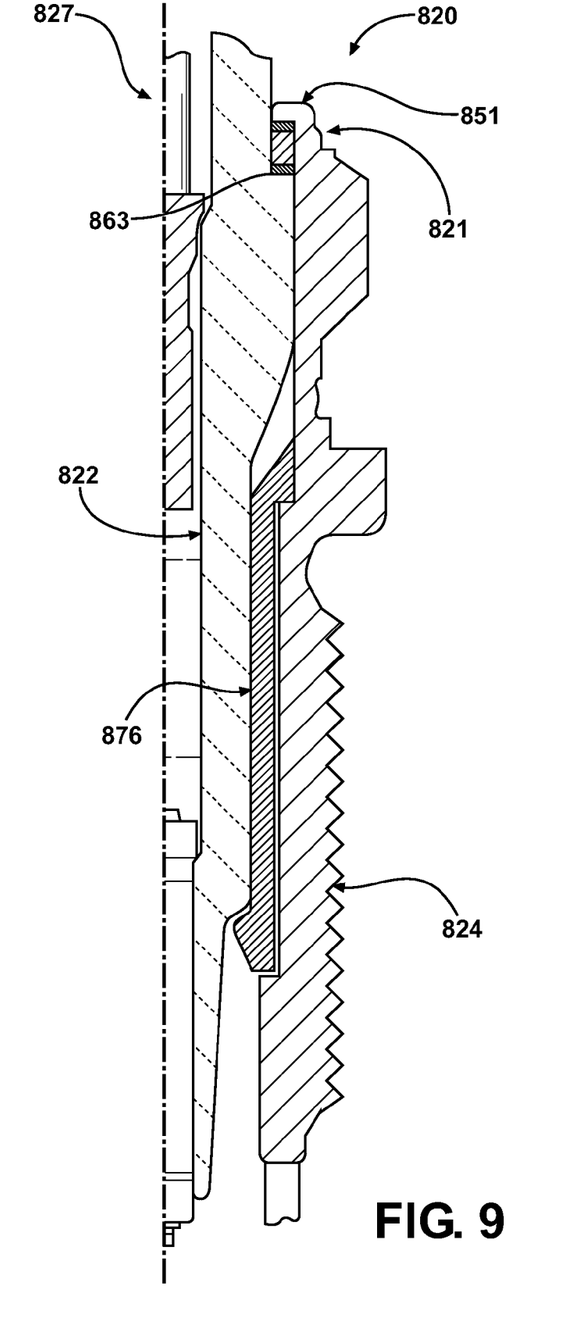
FIG. 9 is a partial cross-sectional view of a spark plug constructed in accordance with yet another aspect of the invention.

In FIG. 9, a spark plug assembly constructed in accordance with another aspect of the invention is shown generally at 820, wherein the same reference numerals as used above, offset by a factor of 800, are used to identify like features as described above. The spark plug assembly 820 has an outer shell 824, an inner shell 876 and a center electrode assembly 827 constructed substantially the same as discussed in relation to FIG. 2. However, the spark plug assembly 820 has a sensor assembly 821 received between the outer shell 824 and an insulator 822, rather than externally to the outer shell. The sensor assembly 821 is captured between an upper most radially extending first shoulder 863 of the insulator 822 and a turnover 851 of the outer shell 824. As such, the sensor assembly 821 senses combustion pressures directly from associated movement of the insulator 822.

Obviously, many modifications and variations of the present invention are possible in light of the above teachings. It is, therefore, to be understood that within the scope of the appended claims, the invention may be practiced otherwise than as specifically described.

What is claimed is:

1. A spark plug assembly, comprising:
a generally annular ceramic insulator having an annular surface extending between an upper mast portion and a lower distal end, said annular surface transitioning via a shoulder to a reduced diameter nose portion;
a metal annular outer shell surrounding at least a portion of said ceramic insulator;
a ground electrode operatively attached to said outer shell;
a center electrode received in said ceramic insulator, said center electrode extending between an upper terminal end and a lower firing end, said lower firing end extending out of said nose portion of said insulator, said lower firing end of said center electrode and said ground electrode providing a spark gap;
a force sensor disposed about said insulator;
an annular inner shell received between said outer shell and said insulator, said inner shell having a first surface configured to confront said shoulder of said insulator along an axial direction;
wherein said inner shell extends to a lower end, said inner shell being fixed to said outer shell adjacent said lower end and the remaining portion of said inner shell remaining spaced from said outer shell by a gap; and
said inner shell has a radially outwardly extending shoulder and said outer shell has a radially outwardly extending flange, said shoulder and said flange being axially spaced from one another by said gap.

2. A spark plug assembly, comprising:
a generally annular ceramic insulator having an annular surface extending between an upper mast portion and a lower distal end, said annular surface transitioning via a shoulder to a reduced diameter nose portion;
a metal annular outer shell surrounding at least a portion of said ceramic insulator;
a ground electrode operatively attached to said outer shell;
a center electrode received in said ceramic insulator, said center electrode extending between an upper terminal end and a lower firing end, said lower firing end extending out of said nose portion of said insulator, said lower firing end of said center electrode and said ground electrode providing a spark gap;
a force sensor disposed about said insulator;
an annular inner shell received between said outer shell and said insulator, said inner shell having a first surface configured to confront said shoulder of said insulator along an axial direction; wherein
said inner shell extends to an upper end, said inner shell being fixed to said outer shell adjacent said upper end and the remaining portion of said inner shell remaining spaced from said outer shell by a gap; and
said inner shell has a radially outwardly extending shoulder adjacent said upper end and said outer shell has a radially inwardly extending shoulder fixed to said radially outwardly extending shoulder.

3. The spark plug assembly of claim 2 wherein said radially inwardly extending shoulder of said outer shell is provided by a radially outwardly extending flange providing a sealing seat, and said radially outwardly extending shoulder of said inner shell confronting said flange.

4. The spark plug assembly of claim 2 wherein the force sensor is disposed between said outer shell and said insulator.

5. The spark plug assembly of claim 4 wherein said outer shell has an end configured to confront said force sensor along an axial direction.

6. The spark plug assembly of claim 2 wherein an annular gap extends between said inner shell and said outer shell from said first surface to a second surface.

7. The spark plug assembly of claim 6 wherein said inner shell is fixed to said outer shell adjacent said second surface.

8. The spark plug assembly of claim 7 wherein said outer shell has an end configured to confront said insulator along an axial direction.

* * * * *